(12) United States Patent
Kawano et al.

(10) Patent No.: US 12,447,987 B2
(45) Date of Patent: Oct. 21, 2025

(54) ELECTRONIC DEVICE AND STORAGE MEDIUM

(71) Applicant: ISUZU MOTORS LIMITED, Tokyo (JP)

(72) Inventors: Takashi Kawano, Fujisawa (JP); Ai Takeda, Fujisawa (JP); Masahiro Seki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 98 days.

(21) Appl. No.: 18/465,193

(22) Filed: Sep. 12, 2023

(65) Prior Publication Data

US 2024/0092381 A1 Mar. 21, 2024

(30) Foreign Application Priority Data

Sep. 21, 2022 (JP) ................................ 2022-149910

(51) Int. Cl.
*B60W 50/14* (2020.01)
*G06V 20/56* (2022.01)
*G06V 20/58* (2022.01)

(52) U.S. Cl.
CPC .......... *B60W 50/14* (2013.01); *G06V 20/582* (2022.01); *G06V 20/588* (2022.01); *B60W 2050/146* (2013.01); *B60W 2300/12* (2013.01); *B60W 2420/403* (2013.01); *B60W 2552/53* (2020.02); *B60W 2555/60* (2020.02)

(58) Field of Classification Search
CPC .......... B60W 50/14; B60W 2050/146; B60W 2300/12; B60W 2420/403; B60W 2552/53; B60W 2555/60; G06V 20/582; G06V 20/588

See application file for complete search history.

(56) References Cited

U.S. PATENT DOCUMENTS

| | | | | |
|---|---|---|---|---|
| 10,336,190 | B2* | 7/2019 | Yokochi | B60K 35/22 |
| 10,740,625 | B2* | 8/2020 | Satomura | G08G 1/0967 |
| 2008/0137908 | A1* | 6/2008 | Stein | G08G 1/096783 |
| | | | | 382/103 |
| 2012/0046855 | A1* | 2/2012 | Wey | G08G 1/09623 |
| | | | | 701/117 |
| 2019/0347940 | A1* | 11/2019 | Endo | B60Q 9/00 |
| 2020/0082793 | A1* | 3/2020 | Ichinokawa | G09G 5/37 |
| 2021/0248395 | A1* | 8/2021 | Yamada | G01C 21/3602 |
| 2022/0172491 | A1* | 6/2022 | Tanikawa | G06V 10/82 |

FOREIGN PATENT DOCUMENTS

| | | |
|---|---|---|
| JP | 2014074627 A | 4/2014 |
| JP | 2018156389 A | 10/2018 |
| JP | 2021022026 A | 2/2021 |

* cited by examiner

*Primary Examiner* — Mohamed Barakat
(74) *Attorney, Agent, or Firm* — Shih IP Law Group, PLLC (57) ABSTRACT

An electronic device includes: a recognition part that recognizes a plurality of signs indicating content of the regulations relating to traveling of a vehicle on the basis of a captured image obtained by capturing a region ahead of the vehicle; a first identification part that identifies, as a corresponding sign, a sign corresponding to a lane in which the vehicle travels among the plurality of signs recognized by the recognition part; and an output part that outputs information corresponding to content of the regulations indicated by the corresponding sign.

6 Claims, 7 Drawing Sheets

ELECTRONIC DEVICE AND STORAGE MEDIUM

CROSS-REFERENCE TO RELATED APPLICATIONS

The present application claims priority to Japanese Patent Applications number 2022-149910, filed on Sep. 21, 2022. The contents of these applications are incorporated herein by reference in their entirety.

BACKGROUND OF THE INVENTION

The present disclosure relates to an electronic device for causing a vehicle to travel and a non-transitory storage medium storing a program.

A technique for detecting a road sign indicating a speed limit or the like is known. Japanese Unexamined Patent Application Publication No. 2021-22026 describes detecting a road sign from an image around a vehicle captured by a camera and recognizing the content of instructions of the road sign using an image analysis technique such as a pattern matching method.

There are cases where signs indicating different maximum speeds or the like are installed for each lane. With the method described in Japanese Unexamined Patent Application Publication No. 2021-22026, there was a problem that the maximum speed corresponding to the vehicle cannot be correctly recognized when signs indicating different maximum speeds are installed for each lane.

BRIEF SUMMARY OF THE INVENTION

The present disclosure focuses on this point, and its object is to provide an electronic device and a non-transitory storage medium storing a program that are capable of improving accuracy of recognizing content of regulations corresponding to a vehicle when a plurality of signs indicating the content of the regulations such as the maximum speeds for different lanes are installed.

An electronic device according to a first aspect of the present disclosure includes: a recognition part that recognizes a plurality of signs indicating content of regulations relating to traveling of a vehicle on the basis of a captured image obtained by capturing a region ahead of the vehicle; a first identification part that identifies, as a corresponding sign, a sign corresponding to a lane in which the vehicle travels among the plurality of signs recognized by the recognition part; and an output part that outputs information corresponding to content of the regulations indicated by the corresponding sign.

A program according to the present disclosure causes a computer to execute the steps of: recognizing a plurality of signs indicating content of regulations relating to traveling of a vehicle on the basis of a captured image obtained by capturing a region ahead of the vehicle; identifying, as a corresponding sign, a sign corresponding to a lane in which the vehicle travels among the plurality of recognized signs; and outputting information corresponding to content of the regulations indicated by the corresponding sign.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of a Vehicle]

Figure 1:
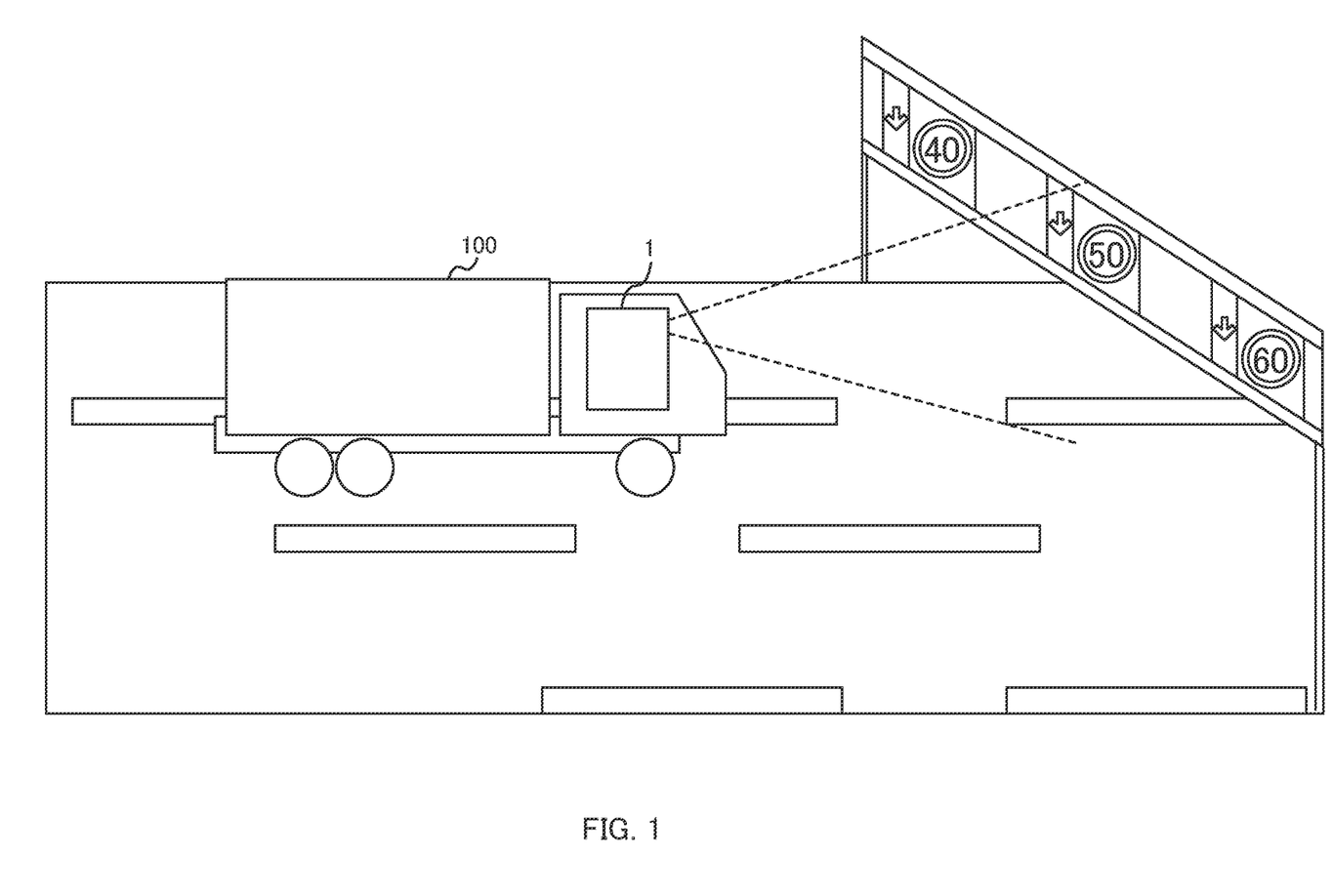
FIG. 1 shows an outline of a vehicle on which an electronic device according to an embodiment is mounted.

FIG. 1 shows an outline of a vehicle 100 on which an electronic device 1 of the present embodiment is mounted. The vehicle 100 is a commercial vehicle such as a truck, for example. The vehicle 100 may have a function of traveling by autonomous driving. The electronic device 1 is an electronic control unit (ECU), for example.

The electronic device 1 generates captured image data obtained by capturing a region ahead of the vehicle 100 using a camera mounted on the vehicle 100. The electronic device 1 identifies a position of a lane in which the vehicle 100 travels, on the basis of the generated captured image data. For example, the electronic device 1 identifies a plurality of lane boundary lines including boundary lines on the left and right sides of the vehicle 100 shown in the captured image, thereby identifying the position of the lane in which the vehicle 100 travels from among a plurality of lanes.

On the basis of the generated captured image data, the electronic device 1 recognizes a plurality of signs indicating content of regulations relating to traveling of the vehicle. In the example shown in FIG. 1, signs each indicating the maximum speed at which a vehicle can travel are installed for each lane. In this case, by using the fact that (i) a position at which each of the signs is installed and (ii) the position of the lane in which the vehicle 100 travels have a predetermined relationship, which will be described later, the electronic device 1 identifies a sign (hereinafter, also referred to as a corresponding sign) corresponding to the lane in which the vehicle 100 travels. The electronic device 1 outputs information corresponding to the content of the regulations such as the maximum speed indicated by the identified corresponding sign to a device such as a display device or a speed controller mounted on the vehicle 100.

In this way, the electronic device 1 can improve accuracy of identifying the content of the regulations indicated by the sign corresponding to the vehicle 100 in the case where the signs indicating the content of the regulations such as the maximum speed or the like, which are different for each lane, are installed.

[Configuration of the Vehicle 100]

Figure 2:
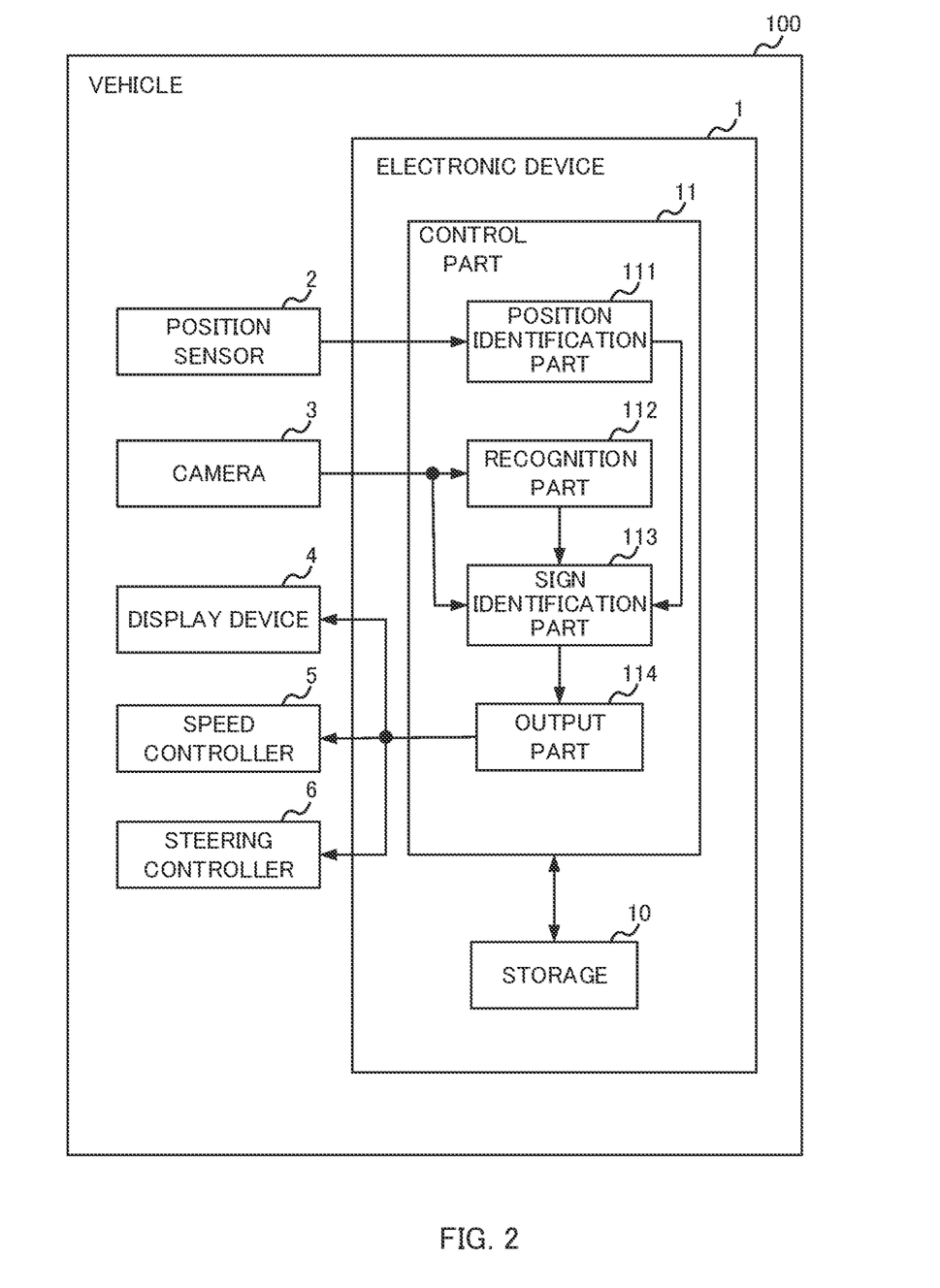
FIG. 2 shows a configuration of the vehicle.

FIG. 2 shows a configuration of the vehicle 100. The vehicle 100 includes the electronic device 1, a position sensor 2, a camera 3, a display device 4, a speed controller 5, and a steering controller 6. The electronic device 1 includes a storage 10 and a control part 11. The control part 11 includes a position identification part 111 (corresponding to a second identification part), a recognition part 112, a sign identification part 113 (corresponding to a first identification part), and an output part 114.

The position sensor 2 is a GPS receiver that receives signals from a plurality of global positioning system (GPS) satellites, for example. The position sensor 2 inputs information included in the received signals to the position identification part 111.

The camera 3 captures the region ahead of the vehicle 100 to generate captured image data. The camera 3 inputs the generated captured image data to the recognition part 112 and the sign identification part 113. The display device 4 is a display for displaying characters, an image, or the like. For example, the display device 4 is provided on an instrument panel of the vehicle 100.

The speed controller 5 controls a velocity at which the vehicle 100 travels by accelerating or decelerating the vehicle 100. The steering controller 6 rotates a steering wheel of the vehicle 100 with a motor or the like to adjust a traveling direction of the vehicle 100.

The storage 10 includes a read only memory (ROM), a random access memory (RAM), and the like, for example. The storage 10 stores a program to be executed by the control part 11. The storage 10 stores sign data in which each piece of content of the regulations indicated by the plurality of signs is associated with sample image data of the plurality of signs. A plurality of pieces of sample image data are associated with each of a plurality of maximum speeds in this sign data. The sign data is used by the recognition part 112 to recognize the sign on the basis of the captured image data.

The storage 10 may further store lane data in which (i) a plurality of lanes and (ii) position information of a plurality of positions included in the plurality of lanes are associated. The position information indicates the latitude and longitude of each of the plurality of positions included in the plurality of lanes, for example. The lane data is used by the sign identification part 113 to identify the lane in which the vehicle 100 travels.

The control part 11 is a processor mounted on the ECU, for example. The control part 11 functions as a position identification part 111, a recognition part 112, a sign identification part 113, and an output part 114 by executing a program stored in the storage 10.

The position identification part 111 (corresponding to the second identification part) identifies a position of the vehicle 100 on the basis of a signal detected by the position sensor 2 mounted on the vehicle 100. For example, the position identification part 111 identifies the latitude and longitude of the position of the vehicle 100. The position identification part 111 outputs information indicating the identified position of the vehicle 100 to the sign identification part 113.

The recognition part 112 recognizes a sign installed ahead of the vehicle 100. First, the recognition part 112 acquires captured image data generated by capturing the region ahead of the vehicle 100 from the camera 3. On the basis of the acquired captured image data, the recognition part 112 recognizes the sign existing ahead of the vehicle 100 and indicating the content of the regulations relating to traveling. The plurality of signs indicating the content of regulations are signs indicating maximum speeds, minimum speeds, or directions in which a vehicle can proceed, for example.

More specifically, the recognition part 112 reads the sign data in which each piece of content of the regulations indicated by the plurality of signs is associated with the sample image data of the plurality of signs from the storage 10. The recognition part 112 references the read sign data and recognizes an area similar to any one piece of the sample image data on the basis of the captured image data. The recognition part 112 identifies the content of the regulations associated with the sample image data similar to the recognized area in the sign data. When a plurality of signs are included in the captured image data, the recognition part 112 identifies each piece of the content of the regulations indicated by the plurality of signs. The recognition part 112 outputs (i) information indicating each position of the plurality of signs recognized from the captured image data and (ii) information indicating the content of the regulations respectively indicated by these plurality of signs to the sign identification part 113.

[Identification of the Corresponding Sign]

When the maximum speed at which the vehicle 100 can travel is set for each lane, signs indicating different maximum speeds may be installed for each lane. When each of the plurality of signs recognized by the recognition part 112 indicates content of the same type of regulations such as the maximum speed or the like in different lanes, the sign identification part 113 identifies, as the corresponding sign, a sign corresponding to the lane in which the vehicle 100 travels, among the plurality of recognized signs.

Figure 3:
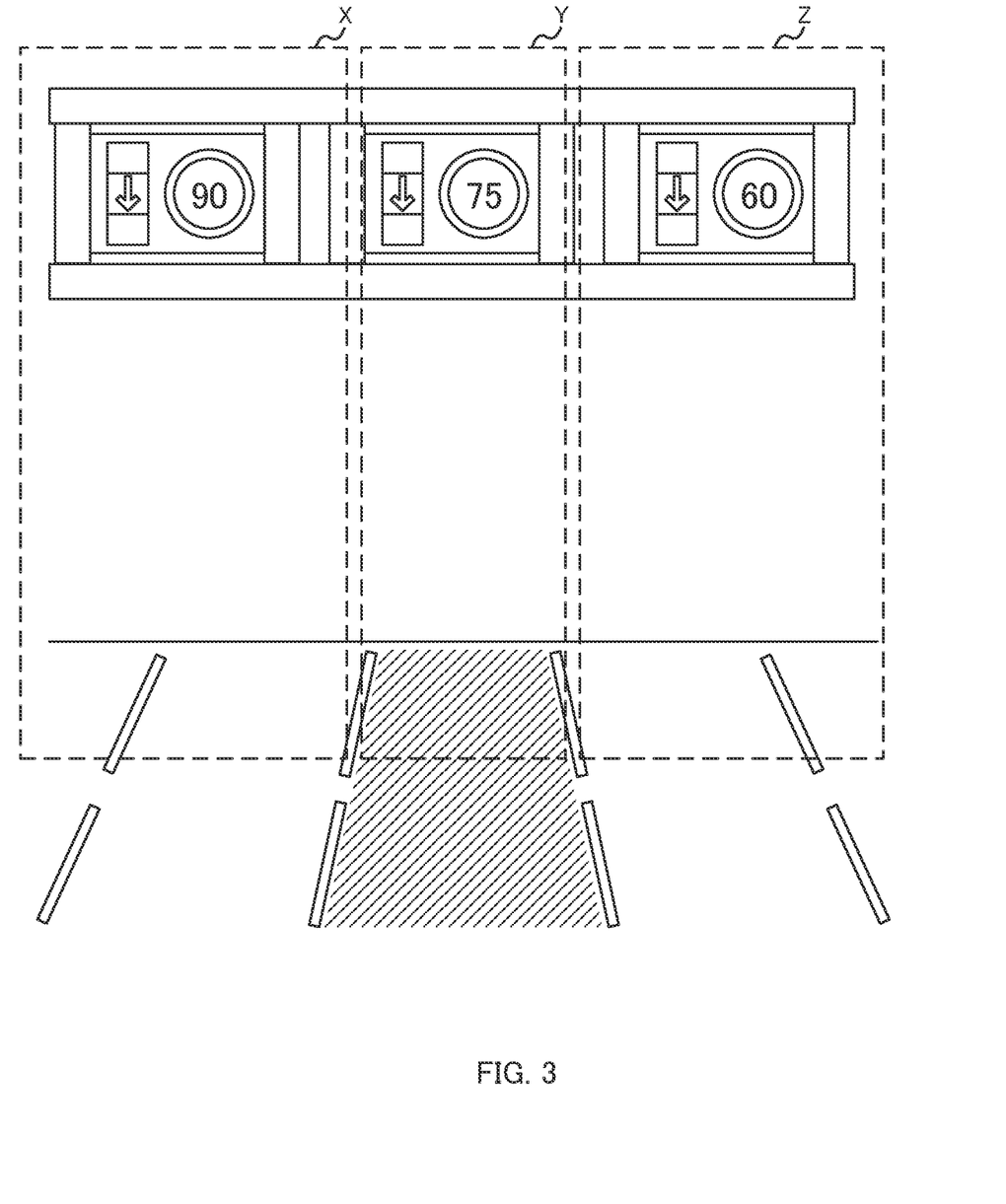
FIG. 3 shows an example of a state in which a plurality of signs are installed.

FIG. 3 is a schematic diagram showing a captured image including a plurality of signs. The sign identification part 113 identifies a position of the lane in which the vehicle 100 travels on the basis of a captured image generated by the camera 3. For example, the sign identification part 113 identifies a plurality of lane boundary lines including boundary lines on the left and right sides of the vehicle 100 shown in the captured image, thereby identifying the position of the lane in which the vehicle 100 travels among the plurality of lanes. In FIG. 3, it is assumed that a center lane (hatched area) is identified as the lane in which the vehicle 100 travels.

The sign identification part 113 identifies a corresponding sign corresponding to the lane in which the vehicle 100 travels, on the basis of a predetermined positional relationship between a lane and a sign. When the plurality of signs indicating content of the same type of regulations are installed for each lane, these signs are installed such that positions of the respective signs and positions of the respective lanes have a predetermined relationship. The sign identification part 113 identifies the corresponding sign using this relationship. For example, in principle, when a plurality of signs indicating the speed limit of a lane are each installed right above the corresponding lane, the sign identification part 113 identifies a sign immediately above the position of the identified lane in which the vehicle 100 travels as the corresponding sign.

In FIG. 3, a sign on the left indicates that the maximum speed is 90 kilometers per hour. A sign in the middle indicates that the maximum speed is 75 kilometers per hour. A sign on the right indicates that the maximum speed is 60 kilometers per hour.

When the recognition part 112 recognizes a plurality of signs indicating content of the same type of regulations such as the maximum speed, the sign identification part 113 classifies the plurality of signs recognized by the recognition part 112 into any one of (i) a sign in an area X on the left side of the identified lane in which the vehicle 100 travels, (ii) a sign in an area Y immediately above the identified lane, and (iii) a sign in an area Z on the right side of the identified lane.

In the example of FIG. 3, the sign identification part 113 classifies the sign on the left side and indicating that the maximum speed is 90 kilometers per hour as the sign in the X area. The sign identification part 113 classifies a sign in the middle and indicating that the maximum speed is 75 kilometers per hour as the sign in the area Y. The sign identification part 113 classifies a sign on the right side and indicating that the maximum speed is 60 kilometers per hour as the sign in the area Z.

The sign identification part 113 identifies the sign classified as the sign in the area Y immediately above the position of the identified lane as the corresponding sign of the vehicle 100. In the example of FIG. 3, the sign identification part 113 identifies the sign that has been classified as the sign in the area Y and indicating that the maximum speed is 75 kilometers per hour as the corresponding sign.

Figure 4:
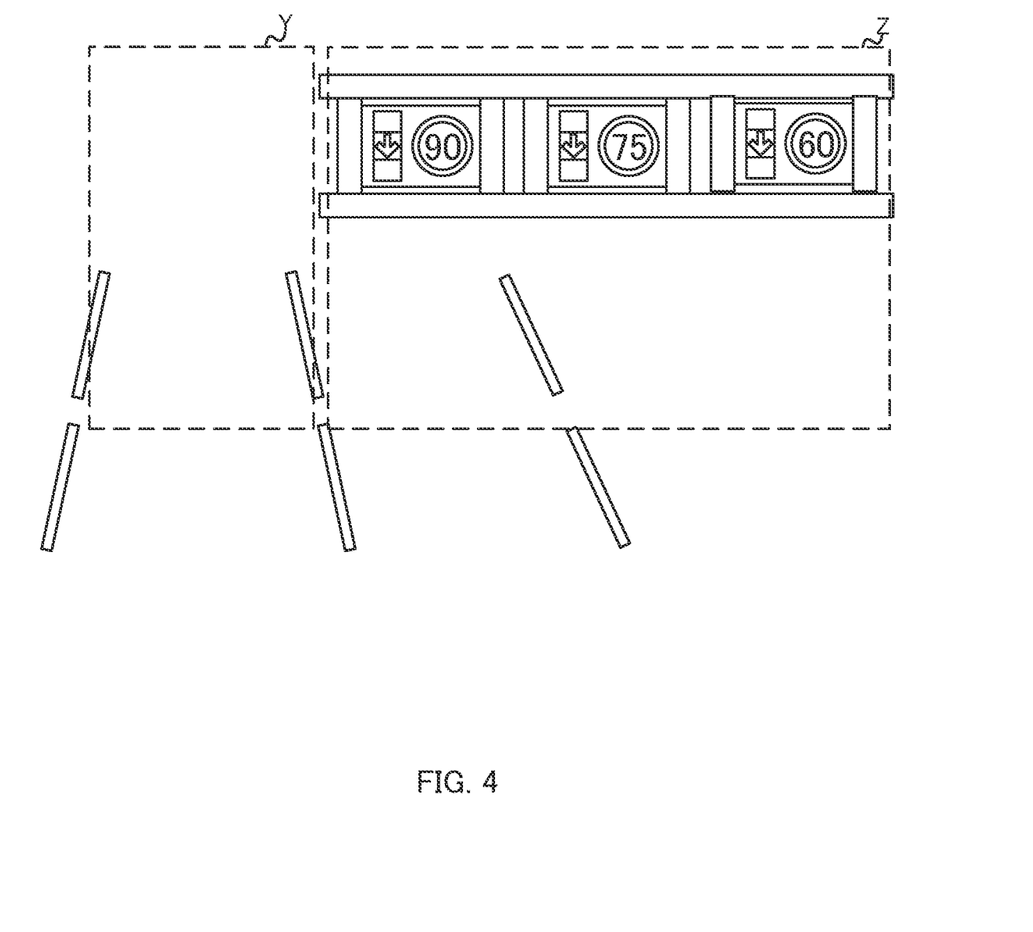
FIG. 4 shows another example of a state in which a plurality of signs are installed.

FIG. 4 shows another example in which a plurality of signs are installed. In the example shown in FIG. 4, no sign is installed in the area Y immediately above the lane in which the vehicle 100 travels, and a plurality of signs are installed in the area Z on the right side of the lane in which the vehicle 100 travels.

If no sign is installed in the area Y immediately above the identified lane, the sign identification part 113 may identify a sign closest to the position of the identified lane as the corresponding sign. In the example of FIG. 4, the sign identification part 113 identifies, as the corresponding sign, a sign closest to the position of the identified lane in which the vehicle 100 travels and indicating that the maximum speed is 90 kilometers per hour among the plurality of signs installed in the area Z. In this way, the sign identification part 113 can identify the sign corresponding to the vehicle 100 even when not one sign is installed immediately above the lane in which the vehicle 100 travels and the plurality of signs are installed in an area different from an area immediately above said lane.

When a sign cannot be identified in the area Y immediately above the identified lane, the sign identification part 113 identifies the sign in the area Z on the right side of the identified lane as the corresponding sign. When a sign cannot be identified in both (i) the area Y immediately above the identified lane and (ii) the area Z on the right side of the lane, the sign identification part 113 identifies the sign in the area X on the left side of the identified lane as the corresponding sign. In a case where the vehicle 100 is a right-hand drive vehicle and is traveling in a country with left-hand traffic, a sign corresponding to the vehicle 100 may be displayed on the right side of the lane in which the vehicle 100 travels. By utilizing such a tendency, the sign identification part 113 can identify a sign corresponding to the vehicle 100 even when the sign is not installed immediately above the lane.

In a case where the vehicle 100 is left-hand drive and travels in a country with right-hand traffic, when a sign cannot be identified in the area Y immediately above the identified lane, the sign identification part 113 may identify a sign in the area X (see FIG. 3) on the left side of the identified lane as the corresponding sign. By reading data for identifying whether the vehicle 100 is a right-hand drive vehicle or a left-hand drive vehicle from the storage 10, the sign identification part 113 can identify whether the vehicle 100 is a right-hand drive vehicle or a left-hand drive vehicle.

Further, the sign identification part 113 is not limited to the example in which the corresponding sign is identified by using the positional relationship between the identified lane and the sign. For example, the sign identification part 113 may identify a sign closest to the center of the captured image generated by the camera 3 as the corresponding sign. Since the sign identification part 113 is configured in this manner, the sign identification part 113 can identify the corresponding sign even when the lane boundary lines of the lane in which the vehicle 100 is traveling cannot be identified due to reasons such as being at night, for example.

The sign identification part 113 may identify the corresponding sign on the basis of the signal detected by the position sensor 2. First, the sign identification part 113 reads the lane data in which (i) the plurality of lanes and (ii) the position information of the plurality of positions included in the plurality of lanes are associated from the storage 10. The sign identification part 113 references the read lane data and identifies a lane stored in the storage 10 in association with the position identified by the position identification part 111. The sign identification part 113 identifies a sign corresponding to the identified lane as the corresponding sign.

Figure 5:
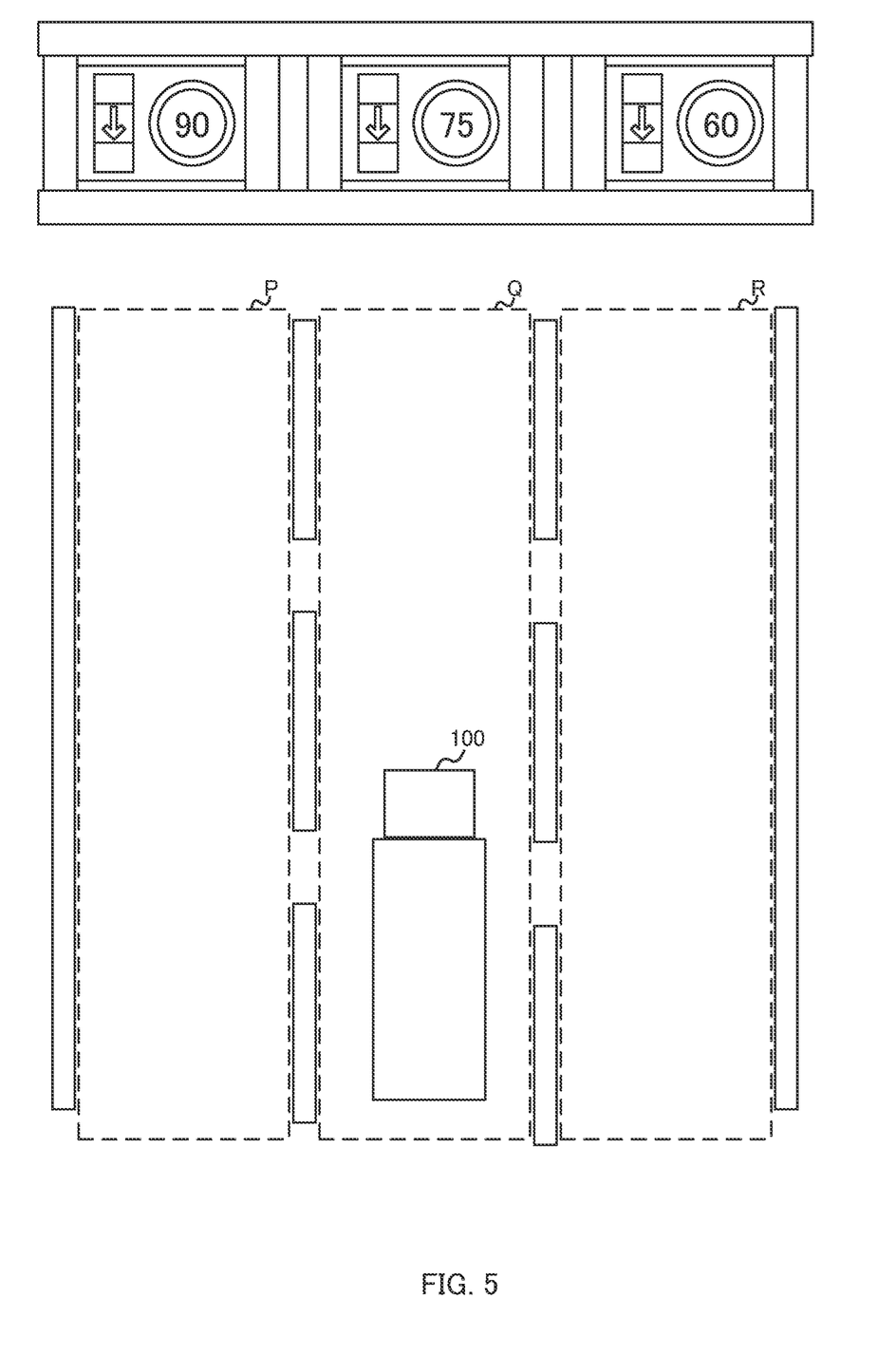
FIG. 5 shows another example of a state in which a plurality of signs are installed.

FIG. 5 shows another example in which a plurality of signs are installed. An area P in which a plurality of positions stored in the lane data in association with a first lane from the left are distributed is shown on the left of FIG. 5. An area Q in which a plurality of positions stored in association with a second lane from the left are distributed is shown in the center of FIG. 5. On the right of FIG. 5, an area R in which a plurality of positions stored in association with a third lane from the left are distributed is shown. The sign identification part 113 identifies that the position of the vehicle 100 identified by the position identification part 111 is included in the area Q corresponding to the second lane from the left.

The sign identification part 113 identifies a sign corresponding to the position of the identified lane as the corresponding sign by using the fact that (i) an order in which a plurality of lanes are arranged in a lateral direction and (ii) an order in which signs indicating the content of the regulations corresponding to the respective lanes are arranged in the lateral direction match. In the example of FIG. 5, since the identified lane is the second from the left, the sign identification part 113 identifies the sign that is second from the left and indicates a maximum speed of 75 kilometers per hour as the corresponding sign.

[Output of Information Corresponding to the Content of the Regulations Indicated by the Corresponding Sign]

The output part 114 outputs information corresponding to the content of the regulations indicated by the corresponding sign identified by the sign identification part 113. The output part 114 outputs the information corresponding to the content of the regulations indicated by the corresponding sign identified by the sign identification part 113 to the display device 4, for example.

Figure 6:
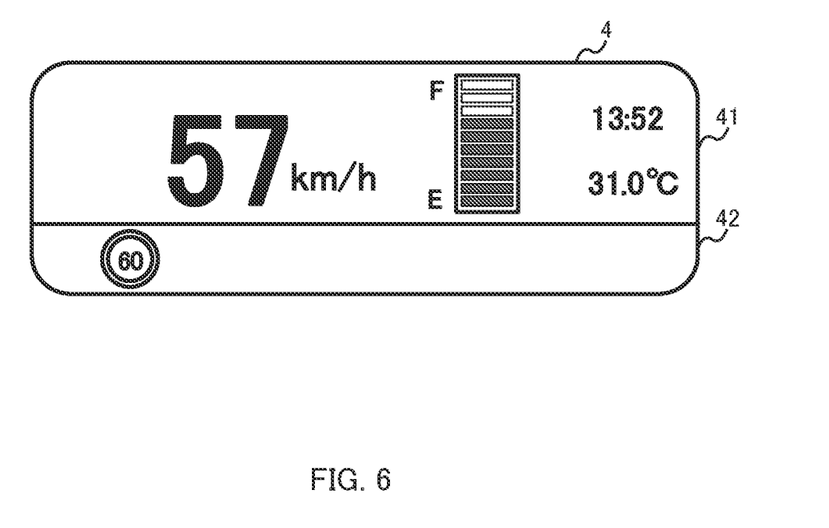
FIG. 6 is a diagram illustrating an example of outputting a corresponding sign by an output part.

FIG. 6 shows an example of output of the corresponding sign by the output part 114. In the example of FIG. 6, the output part 114 outputs information indicating the current speed "57 km/h" at which the vehicle 100 travels, and icon image information indicating a fuel level to the display device 4. The output part 114 outputs icon image information of the corresponding sign indicating a maximum speed of 60 kilometers per hour identified by the sign identification part 113 to the display device 4. At this time, the sign identification part 113 outputs the icon image information that corresponds to the content of the regulations of the sign identified as the corresponding sign by the sign identification part 113 among the pieces of content of the regulations of the plurality of signs recognized by the recognition part 112. By doing this, the current speed and fuel level are displayed in a display area 41, and the maximum speed corresponding to the position of the vehicle 100 is displayed in a display area 42.

The output part 114 may instruct the speed controller 5 or the steering controller 6 to perform a process corresponding to the content of the regulations indicated by the corresponding sign identified by the sign identification part 113. For example, if the content of the regulations indicated by the corresponding sign designates the maximum speed or the minimum speed, the output part 114 instructs the speed controller 5 to travel at a speed corresponding to the maximum speed or the minimum speed. The output part 114 instructs the steering controller 6 to prohibit turning right when the content of the regulations indicated by the corresponding sign prohibits right turns.

[Processing Procedure for Outputting Information Corresponding to the Content of the Regulations Indicated by the Sign]

Figure 7:
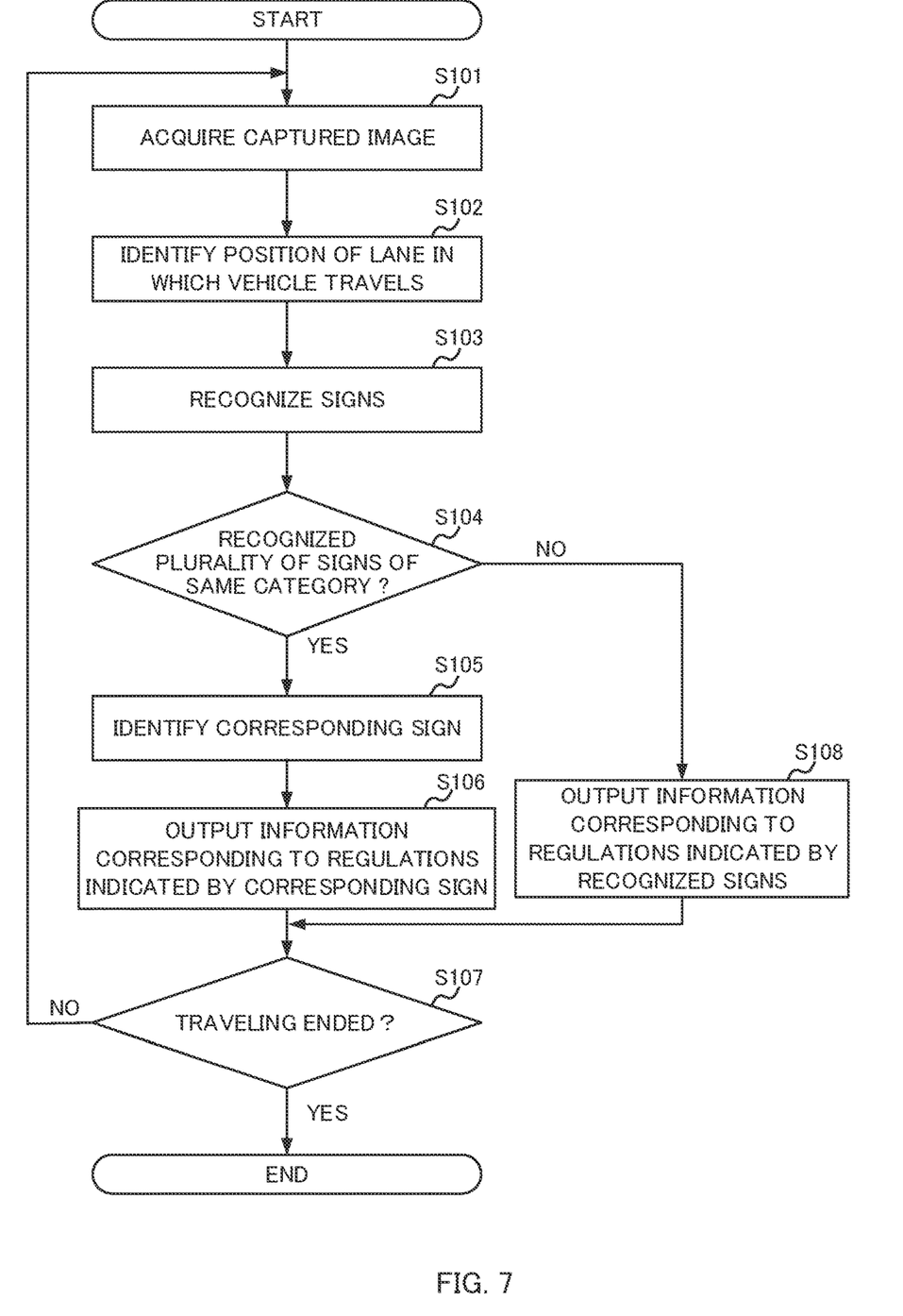
FIG. 7 is a flowchart showing a processing procedure in which the electronic device outputs information corresponding to content of regulations indicated by the sign.

FIG. 7 is a flowchart showing a processing procedure in which the electronic device 1 outputs information corresponding to the content of the regulations indicated by a sign. This processing procedure starts in response to a vehicle being powered on (ignition on). As will be described later, this processing procedure is continuously executed while the vehicle 100 is traveling.

First, the recognition part 112 and the sign identification part 113 acquire captured image data obtained by capturing the region ahead of the vehicle 100 from the camera 3 (S101). The sign identification part 113 identifies a position of a lane in which the vehicle 100 travels on the basis of the acquired captured image data (S102). The recognition part 112 recognizes a plurality of signs indicating the content of the regulations relating to traveling of the vehicle 100, on the basis of the acquired captured image data (S103). The sign identification part 113 determines whether the recognition part 112 has recognized a plurality of signs indicating content of the same type of regulations (S104).

When the sign identification part 113 determines that the recognition part 112 has recognized a plurality of signs indicating content of the same type of regulations (YES in S104), the sign identification part 113 identifies a sign corresponding to the lane in which the vehicle 100 travels among the plurality of signs recognized by the recognition part 112, as a corresponding sign (S105). The output part 114 outputs information corresponding to the content of the regulations indicated by the corresponding sign identified by the sign identification part 113 (S106). The sign identification part 113 determines whether or not an instruction to end traveling of the vehicle 100 is input (ignition OFF) (S107). When it is determined that the instruction to end traveling has been input (YES in S107), the sign identification part 113 ends this processing procedure.

When the output part 114 determines that the recognition part 112 has not recognized a plurality of signs indicating content of the same type of regulations in the determination of S104 (NO in S104), the output part 114 outputs information corresponding to the content of the regulations indicated by the signs recognized by the recognition part 112 (S108), and proceeds to the determination of S107. When it is determined in the determination of S107 that the instruction to end traveling has not been input (NO in S107), the sign identification part 113 returns to the process of S101.

[Effect of the Electronic Device 1 of the Present Disclosure]

The sign identification part 113 can improve the accuracy of identifying the content of the regulations indicated by the sign corresponding to the vehicle 100 in the case where signs indicating the content of the regulations such as the maximum speed or the like, which are different for each lane, are installed.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. An electronic device comprising:
a recognition part that recognizes a plurality of signs indicating content of regulations relating to traveling of a vehicle on the basis of a captured image obtained by capturing a region ahead of the vehicle which travels in a road having plural lines for vehicles traveling in a same direction and wherein the plurality of signs are located over the road;
a first identification part that identifies, as a corresponding sign, a sign corresponding to a lane in which the vehicle travels among the plurality of signs recognized by the recognition part; and
an output part that outputs information corresponding to content of the regulations indicated by the corresponding sign, and wherein
the first identification part identifies a position of the lane on which the car vehicle travels on a basis of the captured image, identifies, as the corresponding sign, a sign in a first area immediately above a position of the lane in which the vehicle travels, identifies a sign in a second area on a right side of the first area as the corresponding sign when a sign cannot be recognized in the first area by the recognition part, identifies a sign in a third area on a left side of the first area as the corresponding sign when a sign cannot be recognized in either the first area nor the second area by the recognition part.

2. The electronic device according to claim 1, wherein the output part outputs information corresponding to the content of the regulations indicated by the corresponding sign to a display device.

3. The electronic device according to claim 1, wherein each of the plurality of signs is a sign indicating content of the same type of regulations in different lanes.

4. The electronic device according to claim 1, further comprising:
a storage that stores positional information of a plurality of positions included in a plurality of lanes in association with the plurality of lanes; and
a second identification part that identifies a position of the vehicle on the basis of a signal detected by a position sensor mounted on the vehicle, wherein
the first identification part identifies the lane stored in the storage in association with the position identified by the second identification part, and identifies a sign corresponding to the lane as the corresponding sign.

5. An electronic device comprising:
a recognition part that recognizes a plurality of signs indicating content of regulations relating to traveling of a vehicle on the basis of a captured image obtained by capturing a region ahead of the vehicle;
a first identification part that identifies, as a corresponding sign, a sign corresponding to a lane in which the vehicle travels among the plurality of signs recognized by the recognition part; and
an output part that outputs information corresponding to content of the regulations indicated by the corresponding sign, wherein the first identification part identifies whether the vehicle is a right-hand drive vehicle or a left-hand drive vehicle, identifies whether the lane in which the vehicle travels has right-hand traffic or left-hand traffic, identifies a position of a lane in which the vehicle travels on the basis of the captured image, and identifies a sign on the left side of the identified lane as a corresponding sign when (i) there is no sign immediately above the identified position of the lane, (ii) the vehicle is the left-hand drive vehicle, and (iii) the lane in which the vehicle travels has right-hand traffic.

6. A non-transitory storage medium storing a program causing a computer to execute:

recognizing step, a plurality of signs indicating content of regulations relating to traveling of a vehicle on the basis of a captured image obtained by capturing a region ahead of the vehicle which travels in a road having plural lines for vehicles traveling in a same direction and wherein the plurality of signs are located over the road;

identifying step, as a corresponding sign, a sign corresponding to the lane in which the vehicle travels among the plurality of recognized signs on a basis of the captured image; and outputting step information corresponding to content of the regulations indicated by the corresponding sign wherein in the identifying step, a sign in a first area immediately above a position of the lane in which the vehicle travels is identified as the corresponding sign, a sign in a second area on a right side of the first area is identified as the corresponding sign when a sign cannot be recognized in the first area, or a sign in a third area on a left side of the first area is identified as the corresponding sign when a sign cannot be recognized in the first area nor the second area.

\* \* \* \* \*